(12) United States Patent
Kishine

(10) Patent No.: US 10,386,864 B2
(45) Date of Patent: Aug. 20, 2019

(54) MASS FLOW CONTROLLER AND A METHOD FOR CONTROLLING A MASS FLOW RATE

(71) Applicant: Hitachi Metals, Ltd., Minato-ku, Tokyo (JP)

(72) Inventor: Yuji Kishine, Mie (JP)

(73) Assignee: HITACHI METALS, LTD., Tokyo (JP)

( * ) Notice: Subject to any disclaimer, the term of this patent is extended or adjusted under 35 U.S.C. 154(b) by 8 days.

(21) Appl. No.: 15/484,517

(22) Filed: Apr. 11, 2017

(65) Prior Publication Data

US 2017/0293309 A1    Oct. 12, 2017

(30) Foreign Application Priority Data

Apr. 12, 2016  (JP) ................................ 2016-079460
Feb. 27, 2017  (JP) ................................ 2017-035030

(51) Int. Cl.
*G05D 7/06*      (2006.01)
*G05D 16/06*     (2006.01)
*G01F 1/00*      (2006.01)

(52) U.S. Cl.
CPC ............. *G05D 7/0635* (2013.01); *G01F 1/00* (2013.01); *G05D 16/0636* (2013.01); *G05D 16/0663* (2013.01); *Y10T 137/7759* (2015.04); *Y10T 137/7761* (2015.04)

(58) Field of Classification Search
CPC ......... Y10T 137/7758; Y10T 137/7759; Y10T 137/7761; G05D 7/0635; G05D 16/0636
USPC ....................................................... 700/282
See application file for complete search history.

(56) References Cited

U.S. PATENT DOCUMENTS

| | | | |
|---|---|---|---|
| 2004/0074311 A1* | 4/2004 | Lull ...................... | G01F 1/696 73/861 |
| 2006/0036404 A1* | 2/2006 | Wiklund ................. | G01F 1/363 702/183 |
| 2011/0015791 A1* | 1/2011 | Smirnov ................ | G01F 1/696 700/282 |
| 2013/0186486 A1* | 7/2013 | Ding ..................... | G01F 25/003 137/487 |
| 2014/0374634 A1* | 12/2014 | Ohtsuki ............... | G05D 7/0635 251/129.06 |
| 2016/0070271 A1* | 3/2016 | Hirata ............... | F16L 55/02718 138/39 |

FOREIGN PATENT DOCUMENTS

WO        2016035558 A1    3/2016

* cited by examiner

*Primary Examiner* — Robert K Arundale
*Assistant Examiner* — Patrick C Williams
(74) *Attorney, Agent, or Firm* — Neugeboren O'Dowd PC

(57) ABSTRACT

Mass flow controllers and methods for controlling mass flow rates are disclosed. A mass flow controller includes a pressure value measurement means that measures one or two or more pressure values derived from pressure P1 of fluid on an upstream side of a pressure difference generate means and pressure P2 of the fluid on a downstream side of the pressure difference generate means, an acceleration means accelerates time variation of the obtained pressure values, a flow meter calculates a flow rate of the fluid based on a pressure value obtained according to the accelerated time variation (accelerated pressure value), and a flow control valve controls the flow rate of the fluid based on the calculated flow rate.

17 Claims, 7 Drawing Sheets

US 10,386,864 B2

MASS FLOW CONTROLLER AND A METHOD FOR CONTROLLING A MASS FLOW RATE

CLAIM OF PRIORITY UNDER 35 U.S.C. § 119

The present Application for Patent claims priority to Japanese Patent Application No. 2016-079460 filed Apr. 12, 2016 and Japanese Patent Application No. 2017-035030 filed on Feb. 27, 2017 both of which are assigned to the assignee hereof and hereby expressly incorporated by reference herein.

BACKGROUND

Field

The present relates generally to a mass flow controller and a method for controlling a mass flow rate, and especially relates to a mass flow controller and a method for controlling a mass flow rate, in which a mass flow rate is controlled based on the pressure of fluid.

Background

A mass flow controller is a device constituted by at least a flow meter which measures a flow rate of fluid, a flow control valve which controls the flow rate of the fluid, and parts including a control circuit which controls the flow meter and the flow control valve. The mass flow controller is widely used for a use in which a mass flow rate of gas supplied into a chamber in a manufacturing process of a semiconductor, etc., for example.

There are various types of flow meters used for a mass flow controller. In a mass flow controller used for controlling a mass flow rate of gas in a manufacturing process of a semiconductor, a thermal type flow meter or a pressure type flow meter is mainly used. In both types of flow meters, a measured value of a flow rate of gas is likely to be affected by pressure of the gas passing through the flow meter. For example, when the pressure of the gas passing through the flow meter changes rapidly, it becomes difficult to accurately measure a flow rate. For this reason, a mass flow controller comprising a mechanism for holding the pressure of the gas passing through a flow meter constant has been proposed for the purpose of accurately measuring and controlling a flow rate.

For example, in International Patent Publication No. WO2016/035558, a mass flow controller comprising a flow meter, a mechanical pressure regulator disposed adjacently on an upstream side of the flow meter, and a flow control valve disposed on a downstream side of the flow meter is described. The mechanical pressure regulator is a pressure-regulating valve or pressure regulator which can adjust pressure only with a mechanical operation without using an electric means.

The mechanical pressure regulator has an action to always maintain pressure of fluid on its downstream side at a predetermined fixed value even when the pressure of the fluid on its upstream side changes within an expected range. For this reason, in the mass flow controller described in WO2016/035558, even in a case where pressure of gas which reaches a flow meter changes, the pressure of the gas can be instantly recovered to its original pressure by a pressure-regulating action which the mechanical pressure regulator has. Since the pressure of the gas which passes through a flow meter is held constant thereby, measurement accuracy of the flow rate measured by the flow meter can be raised.

Technical Problem

It is known that there is a time deviation (timing difference) between a flow rate which is measured (which may be referred to as a "measured flow rate" hereinafter) and a real flow rate of fluid actually flowing (which may be referred to as an "actual flow rate" hereinafter) in any types of flow meters. Generally, when an actual flow rate is changed, the change of a measured flow rate appears belatedly as compared with the change of the actual flow rate.

When a flow rate of fluid is to be controlled by what is called feedback control based on deviation between a flow rate set by a user of a mass flow controller (which may be referred to as a "set flow rate" hereinafter) and a flow rate measured by a flow meter, time deviation of a measured flow rate from an actual flow rate becomes a factor contributing to destabilization of a control action. Specifically, phenomena, such as an overshooting in which a flow rate increases exceeding a set flow rate and/or a hunching in which a measured flow rate vibrates (fluctuates) without stabilizing, become more likely to occur.

In a pressure-type flow meter, a space which has a fixed volume, such as a main flow passage and a duct to a pressure gauge, etc. exists around a laminar flow element as a pressure difference generate means. When a flow rate or pressure, etc. of fluid is changed, the fluid which exists in this space contributed to an action which temporally delays that change, and causes time deviation of a measured flow rate from an actual flow rate. For this reason, when a flow rate is controlled using a measured flow rate as it is, in a mass flow controller comprising a pressure-type flow meter, there is a problem that a control action becomes unstable as compared with a mass flow controller comprising a thermal type flow meter or a response time until a flow rate reaches a set flow rate becomes longer.

Moreover, it is known that a pressure-regulating action of a mechanical pressure regulator does not work due to various causes and therefore fluid may leak from an upstream side of the mechanical pressure regulator toward a downstream side of the mechanical pressure regulator. When such a phenomenon occurs in the mass flow controller comprising the mechanical pressure regulator described in the Patent Document 1, fluid with pressure higher than that in a case where the mechanical pressure regulator operates normally remains in a space between the mechanical pressure regulator and a flow control valve. In this case, when the mass flow controller starts a control action next, this remaining fluid must be discharged to the downstream side until the pressure of the fluid returned to its normal value. For this reason, when leakage in the mechanical pressure regulator occurs in a mass flow controller comprising the mechanical pressure regulator, there is a problem that time deviation of a measured flow rate from an actual flow rate becomes more remarkable.

SUMMARY

According to an aspect, a mass flow controller comprises a flow meter and a flow control valve, the flow meter comprises a pressure difference generate means and a pressure value measurement means configured to measure one or two or more pressure values derived from pressure P1 of fluid on an upstream side of the pressure difference generate means and pressure P2 of the fluid on a downstream side of the pressure difference generate means, and is characterized in that the flow meter further comprises an acceleration means configured to accelerate time variation of the pressure value measured by the pressure value measurement means and is configured to calculate a flow rate of the fluid based on a pressure value obtained according to the time variation accelerated by the acceleration means (accelerated pressure value), and the flow control valve is configured to control the flow rate of the fluid based on the flow rate calculated by the flow meter. In the present specification, "time variation" means "alteration accompanying progress of time."

In this configuration, the flow rate calculated by the flow meter is the flow rate calculated based on the pressure value obtained according to time variation accelerated by the acceleration means, and temporally changes at velocity close to that of time variation of the flow rate of the fluid actually flowing through the mass flow controller. For this reason, the flow rate of the fluid can stably reach a set value in shorter response time as compared with the case where an acceleration means is not used.

According to another aspect, the pressure value may include the pressure P1 of the fluid on the upstream side of the pressure difference generate means and the pressure P2 of the fluid on the downstream side of the pressure difference generate means. Moreover, the pressure value may include differential pressure $\Delta P$ between the pressure P1 of the fluid on the upstream side of the pressure difference generate means and the pressure P2 of the fluid on the downstream side of said pressure difference generate means. In this case, the pressure value may further include any one of the pressure P1 of the fluid on the upstream side of the pressure difference generate means and the pressure P2 of the fluid on the downstream side of the pressure difference generate means.

According to yet another aspect, the acceleration means is configured to accelerate time variation individually for each of two or more pressure values measured by the pressure value measurement means. In this configuration, the mass flow controller can perform more stable and quick control. In addition, an aspect relates to a method for controlling a mass flow rate attained by the above-mentioned method which is carried out by the mass flow controller.

In accordance with another aspect, time deviation between a measured flow rate and an actual flow rate can be reduced as compared with a mass flow controller according to a conventional technology, and stable and quick flow control can be attained, even in a case where a pressure-type flow meter comprising a pressure difference generate means and a pressure value measurement means is used.

A method consistent with many aspects includes measuring one or two or more pressure values derived from pressure P1 of fluid on an upstream side of said pressure difference generate means and pressure P2 of said fluid on a downstream side of said pressure difference generate means, with said pressure value measurement means. A flow rate of said fluid is brought close to a set flow rate that is a flow rate set by a user of said mass flow controller, based on a flow rate of said fluid derived from said pressure value measured by said pressure value measurement means, with said flow control valve. The method also includes accelerating time variation of said pressure value measured by said pressure value measurement means, with said acceleration means, and calculating a flow rate of said fluid based on a pressure value obtained according to said time variation accelerated by said acceleration means, with said flow meter. The flow rate of said fluid is controlled based on said flow rate calculated by said flow meter, with said flow control valve.

DETAILED DESCRIPTION

Embodiments of the present invention will be explained in detail using drawings. The embodiments explained here are nothing but exemplification of embodiments of the present invention, and embodiments of the present invention are not limited to the embodiments exemplified here.

Embodiments of the present invention have been conceived in view of the above-mentioned problems of a mass flow controller according to a conventional technology, and one of objectives of some embodiments of the present invention is to attain a stable and quick control action, even in a case where a flow rate measured by a flow meter has temporally deviated from a real flow rate of fluid actually flowing, in a mass flow controller comprising a pressure-type flow meter.

Figure 1:
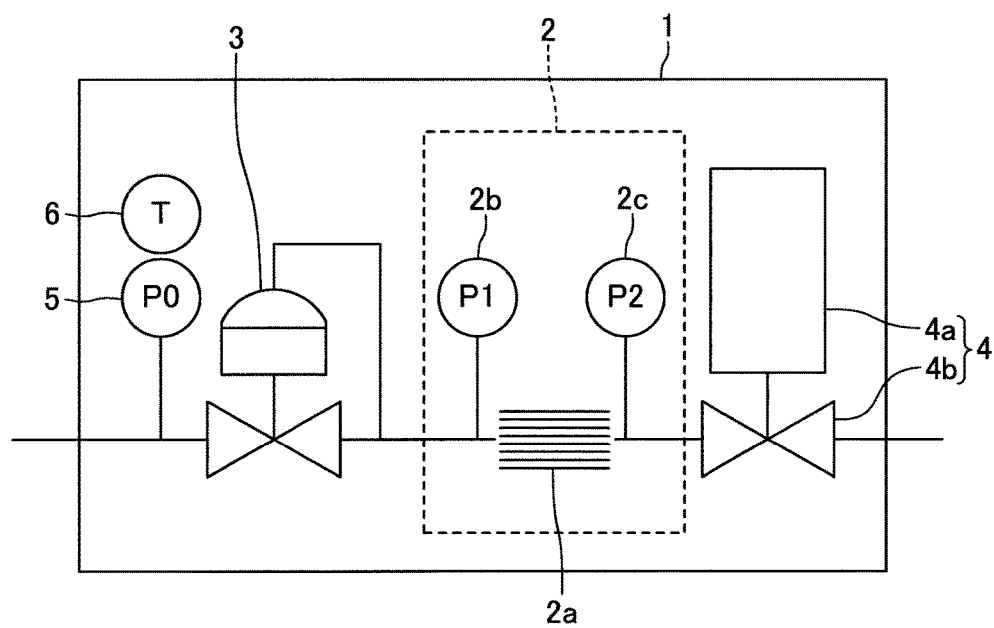
FIG. 1 is a schematic view for showing an example of a configuration of a mass flow controller according to the present invention.

FIG. 1 is a schematic view for showing an example of a configuration of a mass flow controller according to the present invention. Fluid (liquid or gas) flows into a mass flow controller 1 from a left side of the drawing, and flows out of the mass flow controller 1 from its right side. The mass flow controller 1 according to the present invention comprises a flow meter 2 and a flow control valve 4. The flow control valve 4 comprises a valve 4b and an actuator 4a for opening and closing the valve 4b. The actuator 4a may be constituted by a piezo-electric element or a solenoid coil.

The flow meter 2 comprises a pressure difference generate means 2a and a pressure value measurement means configured to measure one or two or more pressure values derived from pressure P1 of fluid on an upstream side of the pressure difference generate means 2a (which will be referred to as "pressure P1" hereinafter) and pressure P2 of the fluid on a downstream side of the pressure difference generate means 2a (which will be referred to as "pressure P2" hereinafter). The pressure difference generate means 2a may be constituted by a member which has fluid resistance, such as a nozzle, an orifice, and a laminar flow element, etc. The pressure value measurement means may be constituted by a well-known pressure sensor or differential pressure sensor.

The flow meter 2 measures a flow rate of fluid using the pressure value measured by the pressure value measurement means. The pressure value is one value or two or more values which are derived from the pressure P1 and the pressure P2. For example, the pressure value measurement means may be constituted by separate pressure sensors which can measure the pressure P1 and the pressure P2 respectively, or may be constituted by one differential pressure sensor which can measure differential pressure between the pressure P1 and the pressure P2. The pressure value in the former case may include two values of the pressure P1 and the pressure P2 themselves, and the pressure value in the latter case may include one value of differential pressure ΔP derived from the pressure P1 and the pressure P2.

The flow meter 2 exemplified in FIG. 1 comprises a laminar flow element as the pressure difference generate means 2a, and is configured to measure the pressure P1 on the upstream side and the pressure P2 on the downstream side of the laminar flow element respectively by pressure sensors 2b and 2c as separate pressure value measurement means. Since the flow rate measured by the flow meter 2 is a volumetric flow rate, this can be converted into a mass flow rate using a mean value of the pressure P1 and the pressure P2, etc., for example. When using one differential pressure sensor instead of the pressure sensors 2b and 2c to measure differential pressure ΔP, a volumetric flow rate can be converted into a mass flow rate by preparing a pressure sensor other than the differential pressure sensor and measuring pressure of the fluid at a position of the pressure-type flow meter.

Figure 2:
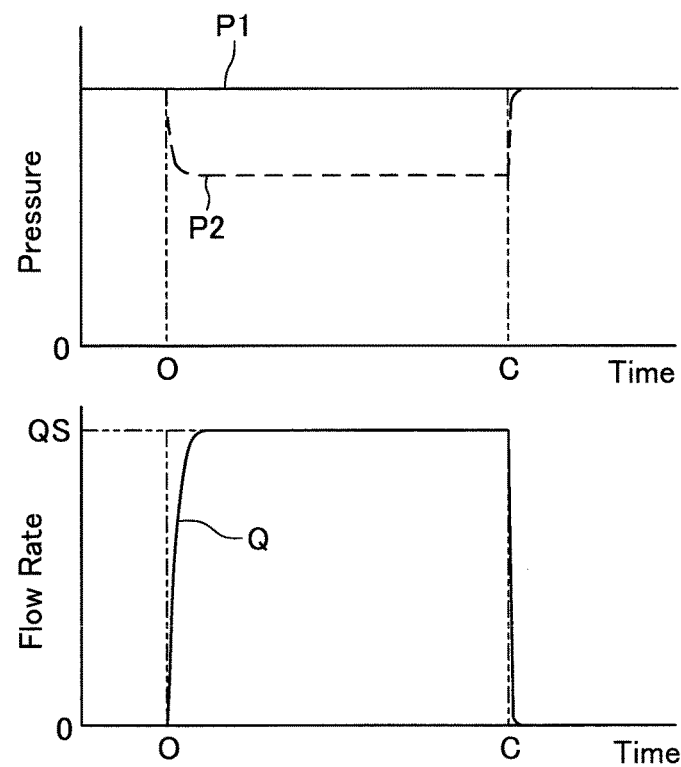
FIG. 2 is a graph for showing a general example of time variation of pressure P1, pressure P2 and a flow rate Q in a mass flow controller.

FIG. 2 is a graph for showing a general example of time variation of pressure P1, pressure P2 and a flow rate Q in a mass flow controller. The mass flow controller has the same configuration as the mass flow controller 1 shown in FIG. 1. Therefore, in the following explanation about this graph, the same reference signs designated to respective constituent elements of the mass flow controller 1 shown in FIG. 1 will be used. In this graph, the pressure P1 is always maintained at a fixed value. While the flow control valve 4 has closed and fluid is not flowing, the pressure P2 is equal to the pressure P1.

When a command signal for passing fluid through the mass flow controller 1 is transmitted at time O (Open), the flow control valve 4 opens and the flow rate Q of the fluid increases. Moreover, since the fluid begins to flow through the pressure difference generate means 2a, the pressure P2 becomes lower than the pressure P1. The mass flow controller 1 controls an opening of the flow control valve 4 using a well-known control method such that the flow rate Q measured by the flow meter 2 becomes equal to a predetermined set flow rate QS. As a result of this, the flow rate Q reaches the set flow rate QS through a short response time after the time O. Moreover, the pressure P2 also reaches a fixed value lower than the pressure P1 through the same response time (refer to a graph drawn with a broken line).

Next, when a command signal for stopping a supply of the fluid to the mass flow controller 1 is transmitted at time C (Close), the flow control valve 4 closes. When the flow control valve 4 is closed, the flow rate Q of the fluid measured by the flow meter 2 becomes zero immediately. Moreover, in connection with this, the pressure P2 also increases immediately, and becomes equal to the pressure P1.

However, as mentioned above, it is known that there is time deviation (generally time lag) between a flow rate which is measured (measured flow rate) and a real flow rate of fluid actually flowing (actual flow rate) in any types of flow meters. When a flow rate of fluid is to be controlled by feedback control based on deviation between a flow rate set by a user (set flow rate) and a measured flow rate, time deviation of the measured flow rate from the actual flow rate may become a factor contributing to destabilization of a control action. Specifically, phenomena, such as an overshooting in which the flow rate increases exceeding the set flow rate and/or a hunching in which the measured flow rate vibrates (fluctuates) without stabilizing, become more likely to occur.

Figure 3:
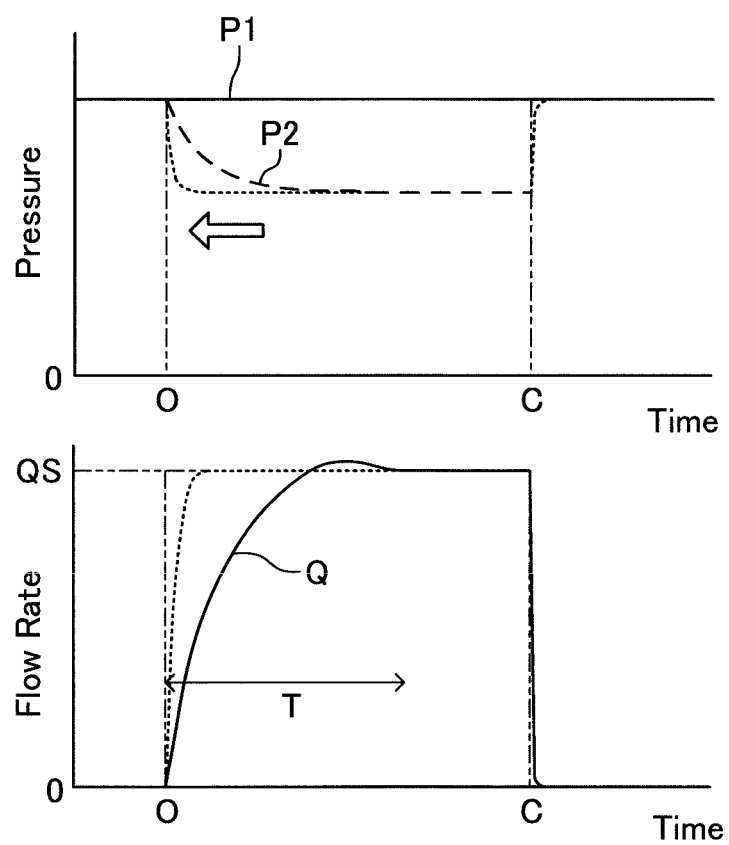
FIG. 3 is a graph for showing a typical example of time variation of pressure P1, pressure P2 and a flow rate Q in a mass flow controller when time deviation of a measured flow rate from an actual flow rate is large.

FIG. 3 is a graph for showing a typical example of time variation of the pressure P1, the pressure P2 and the flow rate Q in the mass flow controller 1 when time deviation of the measured flow rate from the actual flow rate is large. For comparison, the time variation of the pressure P1, the pressure P2 and the flow rate Q shown in FIG. 2 are also illustrated together in FIG. 3 (dotted line). In the graph exemplified here, a value of the pressure P2 after the time O, at which the command signal for passing the fluid to the mass flow controller 1 was transmitted, (broken line) is decreasing more moderately as compared with variation of a value of the pressure P2 shown in the graph of FIG. 2 (dotted line). This is because a certain time period is required for the pressure P2 to decrease due to influence of the fluid which exists in the interior and surrounding space of the pressure difference generate means 2a.

Thus, since the pressure P2 decreases slowly even though the flow control valve 4 is open and the fluid is flowing in fact after the time O, the flow rate Q measured by the flow meter 2 increases later than a flow rate of the fluid actually flowing. Therefore, when the opening of the flow control valve 4 is controlled based on the deviation between the flow rate Q measured by the flow meter 2 and the set flow rate QS, the measured flow rate Q may cause an overshoot to exceed the set flow rate QS as shown in a graph drawn with a solid line in FIG. 3, or may cause a hunching. As a result, response time T until the measured flow rate Q is stabilized to the set flow rate QS becomes longer as compared with the case of FIG. 2 (dotted line).

Figure 4:
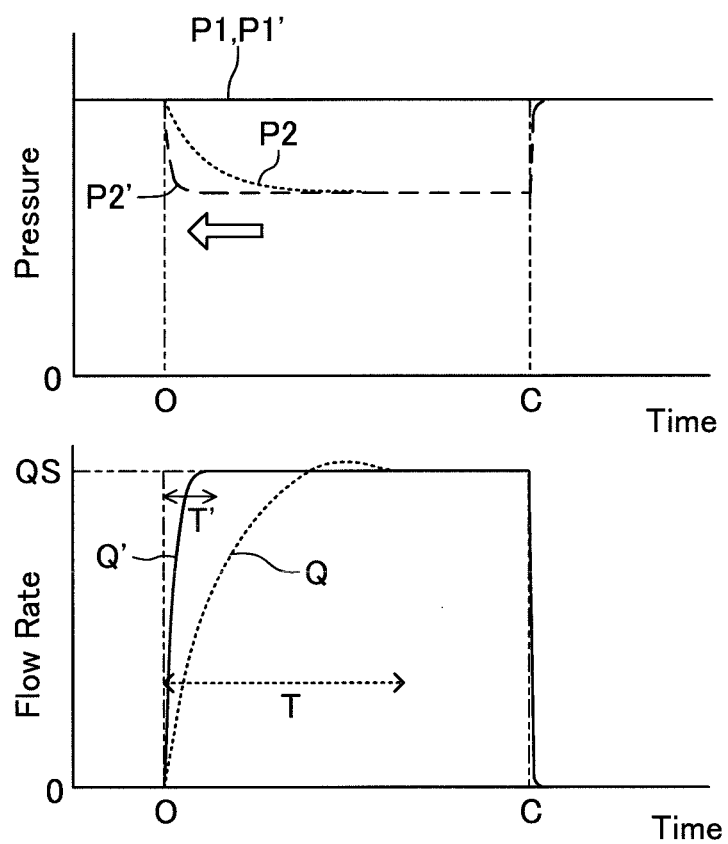
FIG. 4 is a graph for showing an example of time variation of pressure P1', pressure P2' and a flow rate Q' obtained according to time variation accelerated by an acceleration means in a mass flow controller according to the present invention.

Therefore, the mass flow controller 1 according to the present invention speeds up the time variation of the pressure value and makes the measured flow rate Q reach a stable value in a shorter time period by further comprising an acceleration means configured to accelerate time variation of the pressure value measured by the pressure value measurement means. FIG. 4 is a graph for showing an example of time variation of pressure P1', pressure P2' and a flow rate Q' obtained according to time variation accelerated by the acceleration means in the mass flow controller 1 according to the present invention. For comparison, the time variation of the pressure P1, the pressure P2 and the flow rate Q shown in FIG. 3 are also illustrated together in FIG. 4 (dotted line). In the present invention, "to accelerate time variation of a pressure value" means to speed up time variation of a pressure value and perform conversion for compressing the time variation in a direction of a time axis, as shown in a portion after the time O of a graph with a denotation P2' designated thereto in FIG. 4, for example (refer to an outlined white arrow). In the present invention, the symbol "'" is a symbol for representing a value accelerated by the acceleration means and a value calculated based on the value.

In the mass flow controller 1 according to the present invention, the flow meter 2 is configured to calculate a flow rate based on a pressure value obtained according to the time variation accelerated by the acceleration means (accelerated pressure value). A graph to which a denotation Q' is designated in FIG. 4 shows time variation of the flow rate Q' calculated based on the pressure P1' and pressure P2' obtained according to the time variation accelerated by the acceleration means. Since the flow rate Q' is calculated based on the pressure P2' obtained according to the accelerated time variation, the flow rate Q' shows time variation close to time variation of the flow rate of the fluid which is actually flowing. Since the pressure P1 is a fixed value in the example shown in FIG. 4, the value of the pressure P1 does not change even when the time variation is accelerated by the acceleration means.

In the mass flow controller 1 according to the present invention, the flow control valve 4 is configured to control the flow rate of the fluid based on the flow rate calculated by the flow meter 2. The flow rate Q' shown in FIG. 4 is such a flow rate, increases more quickly as compared with the flow rate Q, and reaches the set value QS in response time T' shorter than the response time T, without overshooting. This is because an operation amount of the flow control valve 4 does not become excessive but is controlled to be a suitable value since the time variation of the flow rate Q' is close to the time variation of the flow rate of the fluid which is actually flowing.

In the present invention, it may be confirmed whether the time variation of flow rate Q' shows behavior close to the time variation of the flow rate of the fluid which is actually flowing or not, for example, by a method in which another flow meter with extremely quick response speed is disposed on a downstream side of the mass flow controller 1, or a method in which stability of a response when the set flow rate QS is given to the mass flow controller 1 is investigated.

As the acceleration means in the present invention, any well-known means may be used, as long as it can accelerate time variation of a pressure value. Specifically, the acceleration means may be constituted by an electric analog filter circuit etc. which can accelerate time variation of a pressure value as an analog value. In this case, the acceleration means in the present invention may be configured by setting a time constant of the analog filter circuit to a preferable value.

In an embodiment of the present invention, the acceleration means comprises a conversion means configured to carry out an analog-to-digital conversion of the pressure value measured by the pressure value measurement means and a filtering means configured to accelerate time variation of the pressure value after the analog-to-digital conversion through filtering processing by a digital filter. In this configuration of the present invention, the mass flow controller 1 can perform more stable control as compared with a case where an analog filter circuit etc. is used as the acceleration means.

A sampling period when carrying out the analog-to-digital conversion of the pressure value by the conversion means may be properly determined according to a clock period of a CPU, etc. Specifically, the sampling period may be set to 2 ms (millisecond). Moreover, when the analog-to-digital conversion is carried out using a sampled value of the pressure value as it is, a change of the pressure value may become large due to influence of a noise. In such a case, the influence of a noise can reduced, for example, by using a moving average deviation of the samples for past multiple times (for example, 50 times).

$$P'(z) = \frac{b_{1z} + b_0}{a_{1z} + a_0} \times P(z) \qquad \text{(Formula 1)}$$

Formula 1 is an example of a conversion equation represented in a discrete frequency domain in the case of performing the filtering processing by the digital filter. Here, P(z) represents a function obtained by z transformation of pressure P(t) which is a function of continuous time t, P(z) represents a pressure value before the time variation is accelerated by the acceleration means, and P'(z) represents a pressure value after the time variation is accelerated by the acceleration means. Moreover, a1, a0, b1 and b0 are constants which may be properly determined, respectively.

$$P'[k] = b_1 \times P[k] + b_0 \times P[k-1] - a_0 \times P'[k-1] \qquad \text{(Formula 2)}$$

Formula 2 is a conversion equation represented in a discrete frequency domain in the case of performing the filtering processing by the digital filter, and is expressed in a format of a recurrence formula. Here, k represents discrete time and k−1 represents the previous discrete time. Moreover, a0, b1 and b0 are constants which may be properly determined, respectively. Although Formula 1 and Formula 2 are represented in different domains, they represent the same content.

TABLE 1

| n | P[n] | P'[n] |
|---|---|---|
| 0 | P[0] | P'[0] |
| . | . | . |
| . | . | . |
| . | . | . |
| k − 1 | P[k − 1] | P'[k − 1] |
| k | P[k] | P'[k] |
| . | . | . |
| . | . | . |
| . | . | . |

Table 1 is a table for explaining a calculation procedure by the conversion equation represented by the recurrence formula of Formula 2. The accelerated pressure P'[k] is computed using the pressure values P[k−1] and P[k] before acceleration and the pressure value P'[k−1] after acceleration. The respective pressure values are multiplied by the constants shown in Formula 2.

In the present invention, when the acceleration means is constituted by a conversion means and a filtering means, the conversion means may be constituted by an analog-to-digital converter, and the filtering means may be constituted by software attained with hardware resources, such as a computer implemented in the interior of the mass flow controller 1 or a computer located outside and connected to the mass flow controller 1.

In the present invention, when the acceleration means is constituted by a conversion means and a filtering means, the respective constants contained in Formula 1 and Formula 2 may be determined by trial and error while performing flow control of fluid actually using the mass flow controller 1. Alternatively, they may be also determined by using software which can carry out a simulation for an actual operation of the mass flow controller 1. In this case, it is preferable that the respective constants are determined such that the time variation of the flow rate $Q'$ coincides with the time variation of the flow rate of the fluid, which is actually flowing, as much as possible.

In an embodiment of the present invention, the acceleration means is configured to accelerate time variation individually for each of the two or more pressure values measured by the pressure value measurement means. As specific examples of the two or more pressure values, those including the pressure P1 and the pressure P2 or those including a combination of the differential pressure $\Delta P$ between the pressure P1 and the pressure P2 with either one of the pressure P1 or the pressure P2 can be mentioned.

In this embodiment, "to accelerate time variation individually for each of two or more pressure values" means to accelerate time variation for each of two or more pressure values using individual constants for each of them, neither to accelerate time variation for a flow rate calculated based on two or more pressure values, nor to accelerate time variation for each of two or more pressure values using constants in Formula 1 or Formula 2 common for all of them. Since the flow rate $Q'$ can be brought close to a flow rate of fluid, which is actually flowing, by individually accelerating a pressure value in such a way, a control action of a flow rate can be further made more stable and quicker.

In an embodiment of the present invention, the mass flow controller 1 further comprises a mechanical pressure regulator 3 disposed on an upstream side of the flow meter 2. The mechanical pressure regulator 3 has an action to always maintain pressure of fluid on its downstream side at a predetermined fixed value even when the pressure of the fluid on its upstream side changes within an expected range. For this reason, since the pressure of the fluid which passes through a flow meter is held constant, measurement accuracy of the flow rate measured by the flow meter can be raised.

Figure 5:
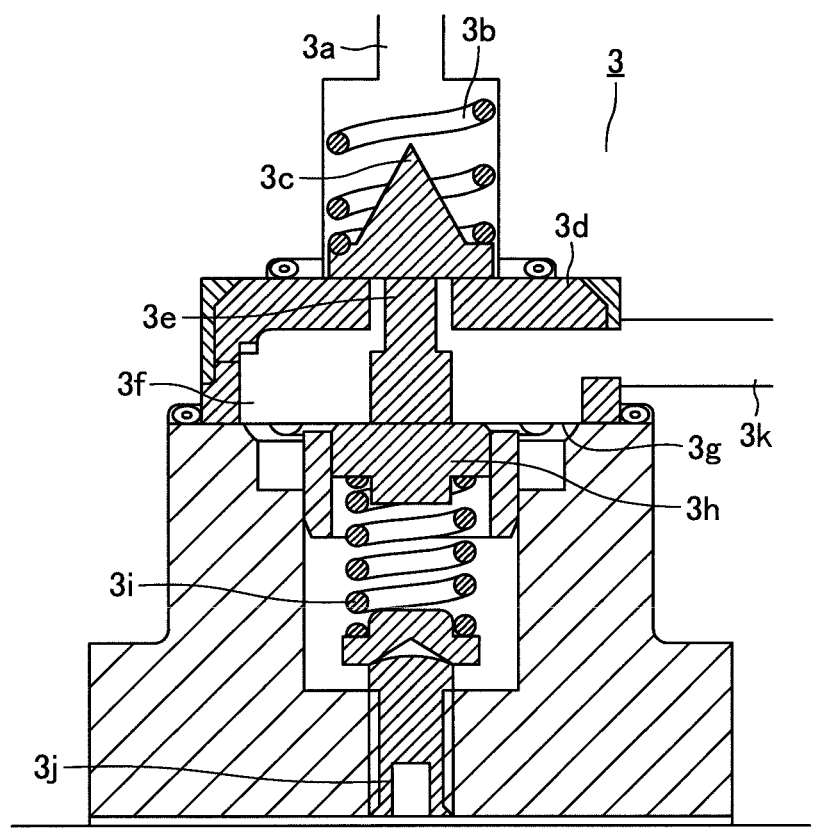
FIG. 5 is a sectional view for showing an example of a structure of a mechanical pressure regulator.

FIG. 5 is a sectional view for showing an example of a structure of the mechanical pressure regulator 3. In the mechanical pressure regulator 3, elastic power with which a poppet spring 3b pushes down a poppet 3c to the side of a valve seat 3d and elastic power with which a pressure-regulating spring 3i pushes up a diaphragm presser 3h and a diaphragm 3g to the side of a pressure-regulating chamber 3f balance through a stem 3e.

Since force with which the fluid pushes down the diaphragm 3g is weak when the pressure P1 of in the pressure-regulating chamber 3f is lower than set pressure PS, the poppet 3c is pushed up and an aperture is made between the poppet 3c and the valve seat 3d. For this reason, the fluid enters from a fluid inlet 3a, passes through the pressure-regulating chamber 3f, and flows out of a fluid outlet 3k.

On the other hand, when the pressure P1 in the pressure-regulating chamber 3f is higher than the set pressure PS, force with which the fluid pushes down the diaphragms work 3g acts, the poppet 3c is displaced to the side of the valve seat 3d, and the aperture between the poppet 3c and the valve seat 3d closes. For this reason, a flow of the fluid is intercepted.

Thus, while a switching action of the aperture between the poppet 3c and the valve seat 3d is performed normally, the pressure P1 is adjusted until it becomes equal to the set pressure PS. The set pressure PS can be changed in accordance with a position of an adjusting screw 3j.

However, for example, when the movement of the stem 3e is hindered for any cause in a state that the aperture between the valve seat 3d and the poppet 3c opened slightly, and when an object is caught in the aperture between the valve seat 3d and the poppet 3c, etc., it becomes difficult to close the aperture between the valve seat 3d and the poppet 3c even when the pressure on the downstream side of the mechanical pressure regulator 3 rises, and leakage of fluid occurs in the mechanical pressure regulator 3. Then, the fluid leaks out through this aperture into a space between the mechanical pressure regulator 3 and the closed flow control valve 4, and the pressure of the fluid in this space rises gradually.

Figure 6:
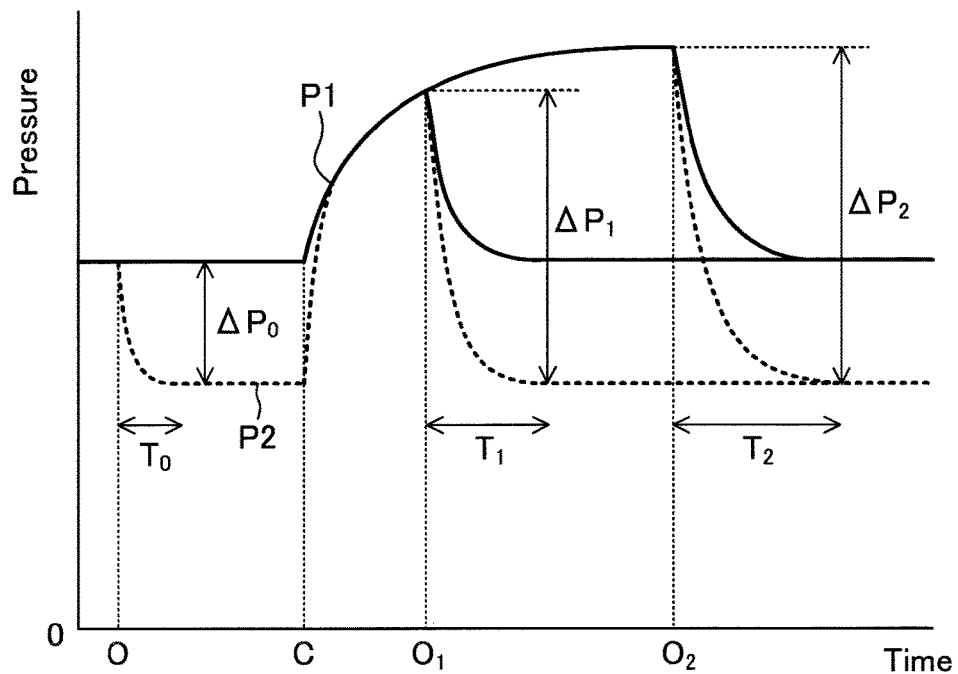
FIG. 6 is a graph for showing a relation between elapsed time after stopping the last operation and time variation of pressure P1 and pressure P2 after resumption of the operation in a mass flow controller according to a conventional technology when leakage occurs in the mechanical pressure regulator.

FIG. 6 is a graph for showing a relation between elapsed time after stopping the last operation and time variation of the pressure P1 and the pressure P2 after resumption of the operation in a mass flow controller when leakage occurs in the mechanical pressure regulator 3. This mass flow controller also has the same configuration as the mass flow controller 1 shown in FIG. 1. Therefore, in the following explanation about this graph, the same reference signs designated to respective constituent elements of the mass flow controller 1 shown in FIG. 1 will be used. During a time period from time zero until time O, it is in a state that the flow control valve 4 is closed and the fluid does not flow. Moreover, it is assumed that the mechanical pressure regulator 3 is also completely closed and no leakage has occurred during this time period. Therefore, no alteration is observed in the pressure P1 and the pressure P2 during this time period. Next, when the flow control valve 4 opens at the time O and control of a flow rate is started, the flow rate Q is stabilized after response time T0 has passed, and the pressure P2 is also held at a fixed value. A difference between the pressure P2 at the time O and the pressure P2 at time C at this time is $\Delta P0$.

Next, when the flow control valve 4 is closed at the time C, although the flow rate Q immediately becomes zero, the pressure P1 increases, and the pressure P2 also increases following this, since leakage has occurred in the mechanical pressure regulator 3. In connection with this leakage, the pressure P1 and the pressure P2 rapidly increase at first, but gently increase thereafter, with progress of time from the time C. The increase in the pressure P1 and the pressure P2 continue until the pressure P1 and the pressure P2 finally reach the pressure P0 of the fluid in a supply line on the upstream side of the mechanical pressure regulator 3.

Thereafter, when the flow control valve 4 is again opened at time O1, the pressure P1 and the pressure P2 are stabilized after response time T1 has passed, and the flow rate Q is also stabilized. A difference $\Delta P1$ between the pressure P2 at the time O1 and the pressure P2 after being stabilized at this time is larger than the $\Delta P0$. Corresponding to this, the response time T1 is longer than the response time T0. Thus, when leakage occurs in the mechanical pressure regulator 3, response time of the mass flow controller 1 becomes longer as compared with a case where no leakage has occurred. This is because a certain time period is required for the pressure P1 on the upstream side and the pressure P2 on the downstream side of the pressure difference generate means 2a to decrease, due to influence of the fluid which has leaked out into the interior and surrounding space of the pressure difference generate means 2a.

In FIG. 6, in a case where the time when the flow control valve 4 is opened at time O2 which is later than the time O1, the pressure P1 and the pressure P2 are stabilized after response time T2 has passed, and the flow rate Q is stabilized. The difference ΔP2 between the pressure P2 at the time O2 and the pressure P2 after being stabilized at this time is larger than the ΔP1. Corresponding to this, the response time T2 becomes longer than the response time T1. Thus, when leakage has occurred in the mechanical pressure regulator 3, the response time of the mass flow controller 1 becomes longer or shorter, according to a length of a time period after stopping the last operation until the operation is resumed.

Also when the flow control valve 4 which has been closed is opened again in a state that leakage has occurred in the mechanical pressure regulator 3 as mentioned above, time deviation between a measured flow rate and an actual flow rate may become a factor contributing to destabilization of a control action in feedback control of the flow rate Q based on the deviation of a set flow rate and a measured flow rate.

Figure 7:
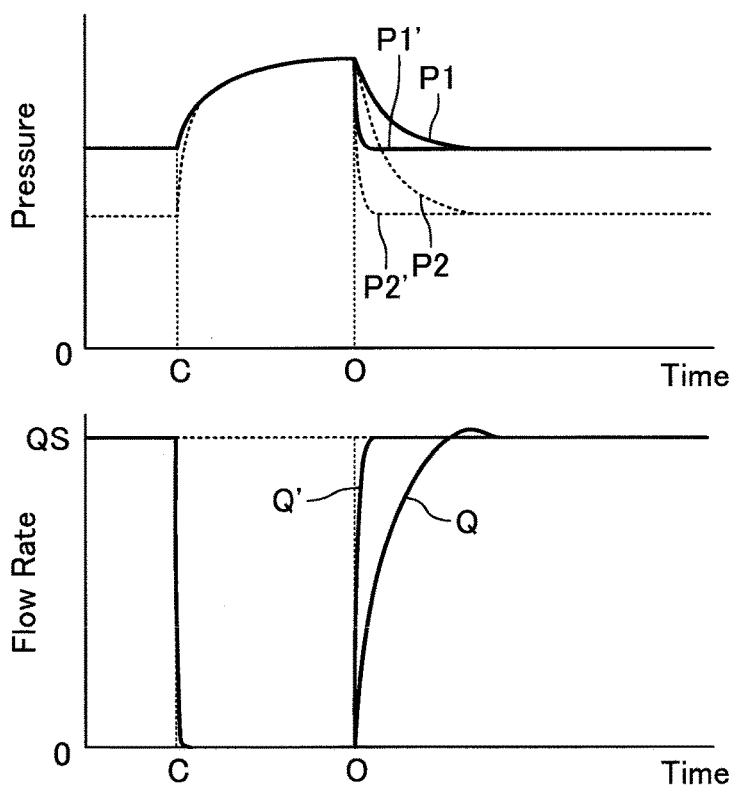
FIG. 7 is a graph for comparing time variation of pressure P1, pressure P2 and a flow rate Q in a mass flow controller according to a conventional technology when time deviation of a measured flow rate from an actual flow rate is large in a state that leakage has occurred in the mechanical pressure regulator with time variation of pressure P1', pressure P2' and a flow rate Q' obtained according to time variation accelerated by an acceleration means in a mass flow controller according to the present invention when time deviation of a measured flow rate from an actual flow rate is large in a state that leakage has occurred in the mechanical pressure regulator.

FIG. 7 is a graph for showing an example of time variation of values of the pressure P1 and the pressure P2 and the of the flow rate Q after the time O when a command signal for flowing fluid is transmitted, in the mass flow controller 1, when time deviation of a measured flow rate from an actual flow rate is large in a state that leakage has occurred in the mechanical pressure regulator. Since time variation of a pressure value is not accelerated in the mass flow controller 1 according to a conventional technology, the pressure P1 and the pressure P2 decrease slowly, even though the flow control valve 4 opens and fluid is flowing in fact after the time O. As a result, the flow rate Q measured by the flow meter 2 increases later than the flow rate of the fluid which is actually flowing. Therefore, when an opening of the flow control valve 4 is controlled based on the deviation between the flow rate Q measured by the flow meter 2 and the set flow rate QS, since the operation amount of the flow control valve 4 becomes excessive, the measured flow rate Q may cause an overshoot to exceed the set flow rate QS as shown in FIG. 7, or may cause a hunching. As a result, response time until the measured flow rate Q is stabilized to the set flow rate QS becomes longer.

Then, in the mass flow controller 1 according to the present invention, the flow meter 2 further comprises an acceleration means configured to accelerate time variation of the one or two or more pressure values measured by the pressure value measurement means, and to calculate a flow rate of the fluid based on a pressure value obtained according to the time variation accelerated by the acceleration means (accelerated pressure value). Then, the flow control valve 4 is configured to control the flow rate of the fluid based on the flow rate calculated by the flow meter 2. Thereby, time variation of the pressure value is speeded up, and the flow rate is made to reach a stable value in a shorter time period. A graph to which a denotation Q' is designated in FIG. 7 shows time variation of the flow rate Q' calculated based on the pressure P1' and pressure P2' obtained according to the time variation accelerated by the acceleration means. Since the flow rate Q' is calculated based on the pressure P1' and the pressure P2' obtained according to the accelerated time variation, the flow rate Q' shows time variation close to time variation of the flow rate of the fluid which is actually flowing.

In the mass flow controller 1 according to the present invention, the flow control valve 4 is configured to control the flow rate of the fluid based on the flow rate calculated by the flow meter 2. The flow rate Q' shown in FIG. 7 is such a flow rate, increases more quickly as compared with the flow rate Q, and reaches the set value QS in response time shorter than the response time T1 and T2, without overshooting. This is because an operation amount of the flow control valve 4 does not become excessive but is controlled to be a suitable value since the time variation of the flow rate Q' is close to the time variation of the flow rate of the fluid which is actually flowing.

Thus, in the mass flow controller 1 according to the present invention, the extent of acceleration of time variation of a pressure value can be adjusted such that deviation between the flow rate measured by with the flow meter 2 (measured flow rate) and the flow rate of the fluid which is actually flowing (actual flow rate) can be almost disregarded. As a result, even in a case where the values of the pressure P1 and the pressure P2 are increasing with progress of time, after leakage occurs in the mechanical pressure regulator 3, as shown in FIG. 6, a stable flow control can be attained in a fixed response time regardless of time when flow control is resumed.

In an embodiment of the present invention, the mechanical pressure regulator 3 is disposed on an upstream side of and adjacently to the flow meter 2, and the flow control valve 4 is disposed on a downstream side of the flow meter 2. Here, "the mechanical pressure regulator 3 is disposed adjacently to the flow meter 2" means that other component parts do not exist between the mechanical pressure regulator 3 and the flow meter 2, but both of them are directly joined with each other by a piping member. It is preferable that the piping member which joins the mechanical pressure regulator 3 and the flow meter 2 is as short as possible.

Since the fluid resistance and the volume of the fluid between the mechanical pressure regulator 3 and the flow meter 2 become small by disposing the mechanical pressure regulator 3 on the upstream side of the flow meter 2 and adjacently to the flow meter 2, a result of adjusting the pressure in the pressure-regulating chamber 3f of the mechanical pressure regulator 3 so as to become equal to the set pressure PS is quickly reflected in pressure inside the flow meter 2. Thereby, since the pressure inside the flow meter 2 is maintained so as to always be equal to the set pressure PS, accuracy of the flow rate measurement by the flow meter 2 is raised.

Moreover, by disposing the flow control valve 4 on the downstream side of the flow meter 2, the flow rate can be made to be zero immediately when a command signal for stopping a supply of the fluid to the mass flow controller 1 is transmitted and the flow control valve 4 closes. In the mass flow controller 1 according to the present invention, even when leakage occurs in the mechanical pressure regulator 3 after a flow passage is intercepted by the flow control valve 4, response time can be kept constant. For this reason, for example, even in a case where it is desired to pass fluid intermittently in a short period, accurate supply of fluid can be attained.

By the way, as mentioned above, the present invention relates also to a method for controlling a mass flow rate attained by the above-mentioned method which is carried out in the mass flow controller according to the present invention. The method for controlling a mass flow rate according to the present invention is a method for bringing a flow rate of fluid close to a set flow rate which is a flow rate set by a user, in a pressure-type flow meter. In this point, the method for controlling a mass flow rate according to the present invention is the same as a method for controlling a mass flow rate according to a conventional technology.

Figure 8:
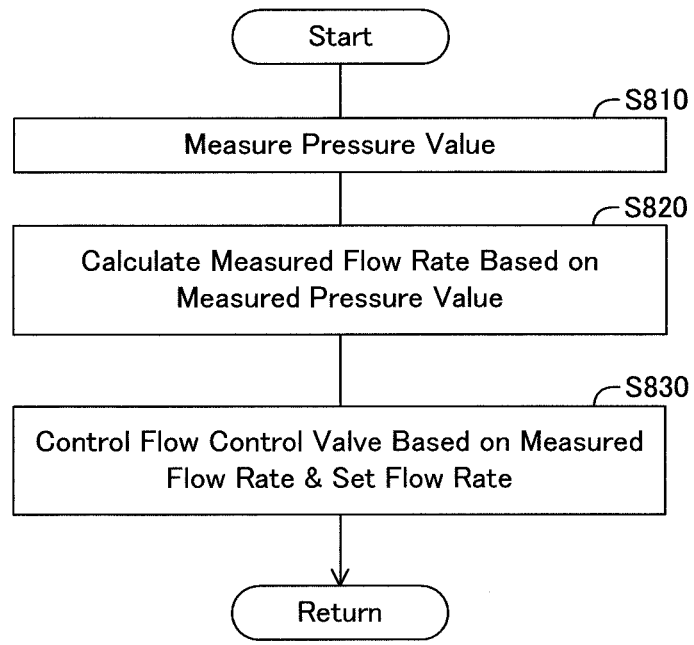
FIG. 8 is a flowchart for showing a routine in a method for controlling a mass flow rate according to a conventional technology.

In a method for controlling a mass flow rate according to a conventional technology, a flow rate of fluid is controlled according to a procedure as shown by a flowchart in FIG. 8, for example. First, in step S810, one or two or more pressure values which are derived from pressure P1 of fluid on an upstream side of a pressure difference generate means and pressure P2 of the fluid on a downstream side of the pressure difference generate means are measured by the pressure value measurement means. Next, in step S820, based on the above-mentioned pressure value measured by the pressure value measurement means, a measured flow rate at that time point is calculated by a flow meter. Then, in step S830, an opening of a flow control valve is controlled by feedback control based on deviation between the above-mentioned measured flow rate calculated by the flow meter and a set flow rate set by a user, and the measured flow rate is brought close to the set flow rate.

However, as mentioned above, there is time deviation (generally time lag) between a flow rate which is measured (calculated) (measured flow rate) and a real flow rate of fluid which is actually flowing (actual flow rate) in any types of flow meters. Therefore, when a flow rate of fluid is to be controlled by feedback control based on deviation between a set flow rate and a measured flow rate as mentioned above, time deviation of the measured flow rate from the actual flow rate may become a factor contributing to destabilization of a control action to lead to problems, such as overshooting of a flow rate and/or hunching of a measured flow rate.

Figure 9:
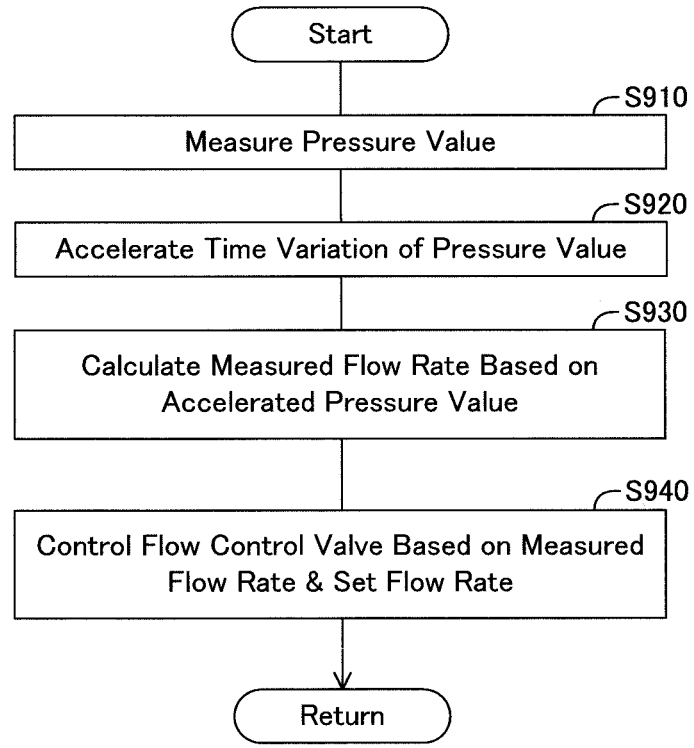
FIG. 9 is a flowchart for showing a routine in a method for controlling a mass flow rate according to the present invention.

On the other hand, the method for controlling a mass flow rate according to the present invention includes carrying out respective steps listed below, according to a procedure as shown by a flowchart in FIG. 9, for example, in a mass flow controller according to the present invention and comprising a flow meter, which comprises a pressure difference generate means and a pressure value measurement means, and a flow control valve.

Step S910: One or two or more pressure values derived from pressure P1 of fluid on an upstream side of the pressure difference generate means and pressure P2 of the fluid on a downstream side of the pressure difference generate means are measured with the pressure value measurement means.

Step S920: Time variation of the pressure value measured by the pressure value measurement means is accelerated, with said acceleration means.

Step S930: A flow rate of the fluid is calculated based on a pressure value obtained according to the time variation accelerated by the acceleration means (accelerated pressure value), with the flow meter.

Step S940: The flow rate of the fluid is controlled based on the flow rate calculated by the flow meter, with the flow control valve, and a flow rate of the fluid is brought close to a set flow rate that is a flow rate set by a user of the mass flow controller.

In accordance with the method for controlling a mass flow rate according to the present invention, which carries out respective steps as mentioned above, even in a case where a pressure-type flow meter comprising a pressure difference generate means and a pressure value measurement means is used, time deviation between a measured flow rate and an actual flow rate can be reduced as compared with a mass flow controller according to a conventional technology, and stable and quick flow control can be attained.

As the acceleration means in the present invention, any well-known means may be used, as long as it can accelerate time variation of a pressure value, as mentioned above. Specifically, the acceleration means may be constituted by an electric analog filter circuit etc. which can accelerate time variation of a pressure value as an analog value. In this case, the acceleration means in the present invention may be configured by setting a time constant of the analog filter circuit to a preferable value.

In an embodiment of the present invention, the acceleration means comprises a conversion means configured to carry out an analog-to-digital conversion of the pressure value measured by the pressure value measurement means and a filtering means configured to accelerate time variation of the pressure value after the analog-to-digital conversion through filtering processing by a digital filter. In this configuration of the present invention, the mass flow controller can perform more stable control as compared with a case where an analog filter circuit etc. is used as the acceleration means, and can accelerate time variation of a pressure value, using such an acceleration means, also in the method for controlling a mass flow rate according to the present invention.

Figure 10:
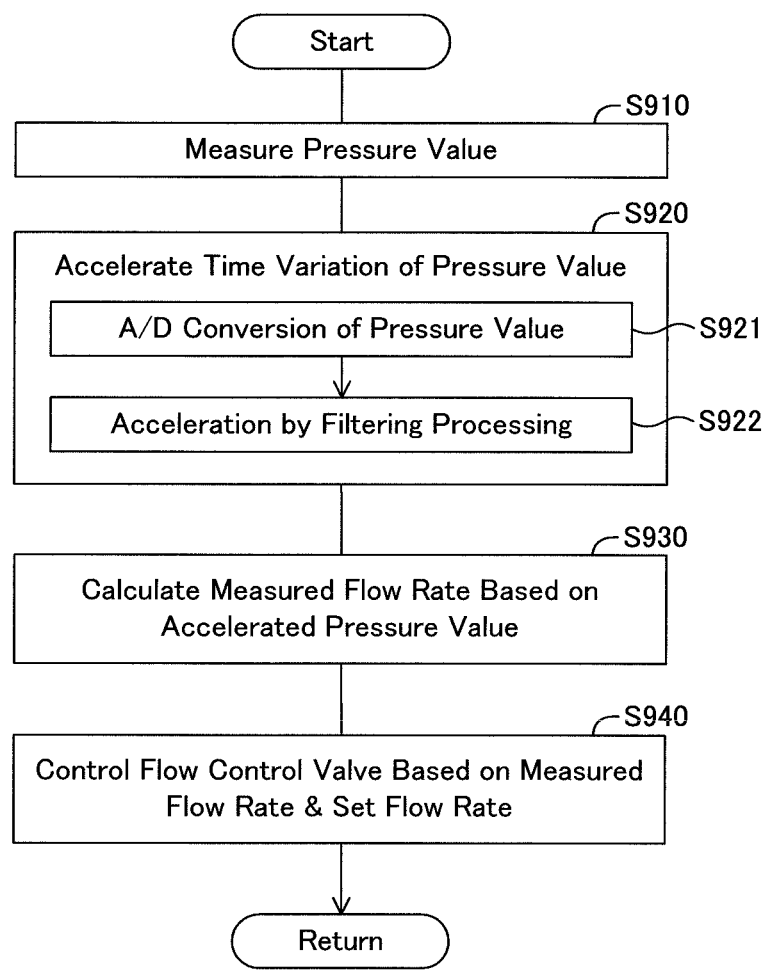
FIG. 10 is a flowchart for showing a routine in a method for controlling a mass flow rate according to an embodiment of the present invention.

In this case, the acceleration means that the mass flow controller, to which the method for controlling a mass flow rate according to the present invention is applied, comprises a conversion means configured to carry out an analog-to-digital conversion and a filtering means configured to carry out filtering processing by a digital filter. And, the step S920 included in the method for controlling a mass flow rate according to the present invention includes carrying out respective steps listed below, as shown by a flowchart in FIG. 10, for example.

Step S921: The analog-to-digital conversion of the pressure value measured by the pressure value measurement means is carried out, with the conversion means.

Step S922: Time variation of the pressure value after the analog-to-digital conversion carried out by the conversion means is accelerated through the filtering processing, with the filtering means.

In addition, the pressure value may include the pressure P1 of the fluid on the upstream side of the pressure difference generate means and the pressure P2 of the fluid on the downstream side of the pressure difference generate means. Alternatively, the pressure value may include differential pressure ΔP between the pressure P1 of the fluid on the upstream side of the pressure difference generate means and the pressure P2 of the fluid on the downstream side of the pressure difference generate means. In the latter case, the pressure value may further include any one of the pressure P1 of the fluid on the upstream side of the pressure difference generate means and the pressure P2 of the fluid on the downstream side of the pressure difference generate means.

Furthermore, time variation may be accelerated individually for each of two or more pressure values measured by the pressure value measurement means, with the acceleration means.

In addition, the method for controlling a mass flow rate according to the present invention may be applied also to a mass flow controller further comprising a mechanical pressure regulator disposed on the upstream side of the flow meter as mentioned above. In this case, it is preferable that the mechanical pressure regulator is disposed adjacently to the flow meter, and it is preferable that the flow control valve is disposed on the downstream side of the flow meter.

Details of configurations of the mass flow controller, to which the method for controlling a mass flow rate according to the present invention is applied, and processing for accelerating time variation of the pressure value measured by the pressure value measurement means, with the acceleration means, etc. have been already explained in the explanation about the mass flow controller according to the present invention including the above-mentioned various embodiments. Therefore, detailed explanation about these matters is not repeated here.

What is claimed is:

1. A mass flow controller comprising: a flow meter comprising: a pressure difference generate means for generating a pressure difference along a fluid flow path through the flow meter; a pressure value measurement means configured to measure one or more pressure values derived from pressure P1 of fluid on an upstream side of said pressure difference generate means and pressure P2 of said fluid on a downstream side of said pressure difference generate means; an acceleration means configured to accelerate time variation of said one or more pressure values measured by said pressure value measurement means wherein said acceleration means includes means for speeding up a time variation of said one or more pressure values and means for performing conversion for compressing the time variation in a direction of a time axis; wherein said flow meter is configured to calculate a flow rate of said fluid based on a pressure value obtained according to said time variation accelerated by said acceleration means; a flow control valve configured to control the flow rate of said fluid based on said flow rate calculated by said flow meter; and wherein said acceleration means is configured to accelerate time variation individually by using individual constants for each of two or more pressure values measured by said pressure value measurement means to accelerate the time variation for each of said two or more pressure values.

2. The mass flow controller according to claim 1, characterized in that said acceleration means comprises:
   a conversion means configured to carry out an analog-to-digital conversion of said pressure value measured by said pressure value measurement means; and
   a filtering means configured to accelerate time variation of said pressure value after said analog-to-digital conversion through filtering processing by a digital filter.

3. The mass flow controller according to claim 2, characterized in that said pressure value includes said pressure P1 of said fluid on said upstream side of said pressure difference generate means and said pressure P2 of said fluid on said downstream side of said pressure difference generate means.

4. The mass flow controller according to claim 2, characterized in that said pressure value includes differential pressure ΔP between said pressure P1 of said fluid on said upstream side of said pressure difference generate means and said pressure P2 of said fluid on said downstream side of said pressure difference generate means.

5. The mass flow controller according to claim 4, characterized in that said pressure value further includes any one of said pressure P1 of said fluid on said upstream side of said pressure difference generate means and said pressure P2 of said fluid on said downstream side of said pressure difference generate means.

6. The mass flow controller according to claim 1, characterized in that said pressure value includes said pressure P1 of said fluid on said upstream side of said pressure difference generate means and said pressure P2 of said fluid on said downstream side of said pressure difference generate means.

7. The mass flow controller according to claim 1, characterized in that said pressure value includes differential pressure ΔP between said pressure P1 of said fluid on said upstream side of said pressure difference generate means and said pressure P2 of said fluid on said downstream side of said pressure difference generate means.

8. The mass flow controller according to claim 7, characterized in that said pressure value further includes any one of said pressure P1 of said fluid on said upstream side of said pressure difference generate means and said pressure P2 of said fluid on said downstream side of said pressure difference generate means.

9. The mass flow controller according to claim 1, characterized by further comprising a mechanical pressure regulator disposed on an upstream side of said flow meter.

10. The mass flow controller according to claim 9, characterized in that:
    said mechanical pressure regulator is disposed adjacently to said flow meter; and
    said flow control valve is disposed on a downstream side of said flow meter.

11. A method for controlling a mass flow rate in a mass flow controller comprising a flow meter, which comprises an acceleration means, a pressure difference generate means for generating a pressure difference along a fluid flow path through the mass flow controller, and a pressure value measurement means, and a flow control valve, the method including: measuring one or more pressure values derived from a pressure P1 of fluid on an upstream side of said pressure difference generate means and pressure P2 of said fluid on a downstream side of said pressure difference generate means, with said pressure value measurement means; bringing a flow rate of said fluid close to a set flow rate that is a flow rate set by a user of said mass flow controller, based on a flow rate of said fluid derived from said pressure value measured by said pressure value measurement means, with said flow control valve; accelerating time variation of said pressure value measured by said pressure value measurement means, with said acceleration means wherein accelerating the time variation of said pressure value includes speeding up a time variation of said one or more pressure values and means for performing conversion for compressing the time variation in a direction of a time axis; calculating a flow rate of said fluid based on a pressure value obtained according to said time variation accelerated by said acceleration means, with said flow meter; controlling the flow rate of said fluid based on said flow rate calculated by said flow meter, with said flow control valve; and accelerating time variation individually by using individual constants for each of two or more pressure values measured by said pressure value measurement means to accelerate the time variation for each of said two or more pressure values.

12. The method for controlling a mass flow rate according to claim 11, including:
    carrying out an analog-to-digital conversion of said pressure value measured by said pressure value measurement means; and
    accelerating time variation of said pressure value after said analog-to-digital conversion by filtering processing with a digital filter.

13. The method for controlling a mass flow rate according to claim 12, characterized in that said pressure value includes said pressure P1 of said fluid on said upstream side of said pressure difference generate means and said pressure P2 of said fluid on said downstream side of said pressure difference generate means.

14. The method for controlling a mass flow rate according to claim 12, characterized in that said pressure value includes differential pressure ΔP between said pressure P1 of said fluid on said upstream side of said pressure difference generate means and said pressure P2 of said fluid on said downstream side of said pressure difference generate means.

15. The method for controlling a mass flow rate according to claim 14, characterized in that said pressure value further includes any one of said pressure P1 of said fluid on said upstream side of said pressure difference generate means and said pressure P2 of said fluid on said downstream side of said pressure difference generate means.

16. The method for controlling a mass flow rate according to claim 11, characterized in that said pressure value includes differential pressure ΔP between said pressure P1 of said fluid on said upstream side of said pressure difference generate means and said pressure P2 of said fluid on said downstream side of said pressure difference generate means.

17. The method for controlling a mass flow rate according to claim 16, characterized in that said pressure value further includes any one of said pressure P1 of said fluid on said upstream side of said pressure difference generate means and said pressure P2 of said fluid on said downstream side of said pressure difference generate means.

\* \* \* \* \*